(12) United States Patent
Templin et al.

(10) Patent No.: US 8,898,482 B2
(45) Date of Patent: Nov. 25, 2014

(54) ENCRYPTION SYSTEM USING CLIENTS AND UNTRUSTED SERVERS

(75) Inventors: Christopher Templin, Northampton, MA (US); Jonathan Templin, Providence, RI (US); Andrew Shearer, Pawtucket, RI (US)

(73) Assignee: Lockify, Inc., Providence, RI (US)

( * ) Notice: Subject to any disclaimer, the term of this patent is extended or adjusted under 35 U.S.C. 154(b) by 0 days.

(21) Appl. No.: 13/032,063

(22) Filed: Feb. 22, 2011

(65) Prior Publication Data

US 2011/0296179 A1 Dec. 1, 2011

Related U.S. Application Data

(60) Provisional application No. 61/306,617, filed on Feb. 22, 2010.

(51) Int. Cl.
*H04L 29/06* (2006.01)
*H04L 9/08* (2006.01)
*G06F 21/60* (2013.01)
*H04L 9/32* (2006.01)

(52) U.S. Cl.
CPC .......... *H04L 63/168* (2013.01); *H04L 63/0428* (2013.01); *H04L 9/088* (2013.01); *G06F 21/606* (2013.01); *H04L 9/08* (2013.01); *H04L 63/062* (2013.01); *H04L 63/08* (2013.01); *H04L 63/123* (2013.01); *H04L 2209/76* (2013.01); *H04L 9/321* (2013.01); *H04L 9/3236* (2013.01)
USPC ................ 713/193; 713/194; 726/27; 726/30

(58) Field of Classification Search
USPC ................................ 713/193, 194; 726/27, 30
See application file for complete search history.

(56) References Cited

U.S. PATENT DOCUMENTS 6,389,535 B1 * 5/2002 Thomlinson et al. ......... 713/165
6,983,365 B1 * 1/2006 Douceur et al. .............. 713/165

(Continued)

FOREIGN PATENT DOCUMENTS

KR 1019980050938 A 9/1998
WO 2005094264 A2 10/2005

OTHER PUBLICATIONS

Abe, Mari; Hori, Masahiro; "Robust Pointing by XPath Language: Authoring Support and Empirical Evaluation", Proceedings of the Symposium on Applications and the Internet, Jan. 27-31, 2003, pp. 156-165.*

(Continued)

*Primary Examiner* — Victor Lesniewski
(74) *Attorney, Agent, or Firm* — Merchant & Gould P.C.

(57) ABSTRACT

In one embodiment of the present invention, a first user—the creator—uses a web browser to encrypt some information. The web browser provides to the creator a URL which contains the key used for encryption, such as in the form of an anchor embedded within a URL. The web browser also provides a hash of the cryptographic key and the encrypted information to a web server. The creator transmits the URL to a second user—the viewer—who provides the URL to a web browser, thereby causing the web browser to navigate to a decryption web page maintained by the web server, but without transmitting the cryptographic key to the web server. The viewer's web browser hashes the cryptographic key and sends the hash to the web server, which uses the hash to identify and return the encrypted information to the viewer's web browser, which in turn uses the encryption key to decrypt the message and display the decrypted message to the viewer.

8 Claims, 2 Drawing Sheets

(56) References Cited

U.S. PATENT DOCUMENTS

| | | | |
|---|---|---|---|
| 7,089,425 B2* | 8/2006 | Chan | 713/189 |
| 7,171,567 B1 | 1/2007 | Bayer et al. | |
| 7,353,204 B2* | 4/2008 | Liu | 705/50 |
| 7,373,517 B1* | 5/2008 | Riggins | 713/184 |
| 7,493,499 B1 | 2/2009 | Deaver et al. | |
| 7,506,161 B2 | 3/2009 | Mizrah | |
| 7,512,792 B2* | 3/2009 | Arroyo et al. | 713/167 |
| 7,640,578 B2 | 12/2009 | Vasnani et al. | |
| 7,673,329 B2 | 3/2010 | Hui Hsu et al. | |
| 7,793,100 B2* | 9/2010 | Arroyo et al. | 713/167 |
| 7,908,490 B2* | 3/2011 | Sudhakar | 713/193 |
| 8,024,565 B2* | 9/2011 | Arroyo et al. | 713/166 |
| 8,140,861 B2* | 3/2012 | Lohman et al. | 713/193 |
| 8,413,138 B2* | 4/2013 | Nath et al. | 717/178 |
| 8,479,008 B2* | 7/2013 | Lin et al. | 713/178 |
| 2002/0083178 A1 | 6/2002 | Brothers | |
| 2002/0091928 A1 | 7/2002 | Bouchard et al. | |
| 2002/0103917 A1* | 8/2002 | Kay et al. | 709/229 |
| 2003/0097564 A1* | 5/2003 | Tewari et al. | 713/171 |
| 2004/0030918 A1 | 2/2004 | Karamchedu et al. | |
| 2004/0109567 A1* | 6/2004 | Yang et al. | 380/277 |
| 2004/0249817 A1 | 12/2004 | Liu et al. | |
| 2006/0005018 A1* | 1/2006 | Alculumbre | 713/165 |
| 2006/0248336 A1 | 11/2006 | Bruns et al. | |
| 2007/0055869 A1* | 3/2007 | Peng et al. | 713/162 |
| 2007/0143601 A1* | 6/2007 | Arroyo et al. | 713/166 |
| 2008/0022122 A1* | 1/2008 | Parkinson et al. | 713/185 |
| 2008/0077703 A1* | 3/2008 | Lee | 709/232 |
| 2008/0162946 A1* | 7/2008 | Lohman et al. | 713/193 |
| 2008/0208867 A1* | 8/2008 | Poston et al. | 707/9 |
| 2009/0006869 A1* | 1/2009 | Satya Sudhakar | 713/193 |
| 2009/0063538 A1* | 3/2009 | Chitrapura et al. | 707/102 |
| 2009/0228395 A1* | 9/2009 | Wegner et al. | 705/59 |
| 2009/0307490 A1 | 12/2009 | Dancer | |
| 2009/0313483 A1* | 12/2009 | Ranade | 713/193 |
| 2010/0082989 A1* | 4/2010 | Bussard et al. | 713/176 |
| 2010/0083003 A1* | 4/2010 | Spackman | 713/193 |
| 2010/0287171 A1* | 11/2010 | Schneider | 707/759 |

OTHER PUBLICATIONS

Wan, Yuan; Tong, Hengqing; "URL Assignment Algorithm of Crawler in Distributed System Based on Hash", IEEE International Conference on Networking, Sensing and Control, Apr. 6-8, 2008, pp. 1632-1635.*

* cited by examiner

ENCRYPTION SYSTEM USING CLIENTS AND UNTRUSTED SERVERS

CROSS-REFERENCE TO RELATED APPLICATIONS

This application claims priority from U.S. Provisional Patent Application Ser. No. 61/306,617, filed on Feb. 22, 2010, entitled, "Encrypting System using Web Browsers and Untrusted Web Servers," which is hereby incorporated by reference herein.

BACKGROUND

People often have a need to communicate sensitive information with each other confidentially, i.e., in a way that does not expose the sensitive information to third parties. Internet-based communications such as email, instant messaging, SMS, and direct messaging via social networking sites such as Twitter and Facebook, are a natural choice due to their ease-of-use and ubiquity. Many people do not realize that by default most Internet-based communications methods offer little or no protection against unauthorized access.

Other people are aware of the security risks, but nevertheless use such insecure methods due to the difficulties of using more secure alternatives. In short, a large number of Internet users communicate sensitive information insecurely over the Internet due to their ignorance, lack of technical sophistication, or belief that the cost in effort of using secure methods outweighs the benefit.

In contrast, sophisticated users who have a strong interest in maintaining the confidentiality of their sensitive information often use technical means to protect their sensitive information. Strong encryption is recognized as the best technical means to prevent unauthorized access by third parties.

Encryption is the algorithmic altering of data to render it unintelligible. The reverse process, known as decryption, can only be performed by those possessing the encrypted data and an specific extra piece of data (the "key"). Possession of either the encrypted data OR the key (but not both) by unauthorized individuals is not sufficient for unauthorized access.

There are two major types of unauthorized access. The first is "during transmission", i.e. the sensitive message is intercepted by unauthorized parties while it is traveling over the Internet. The second form of exposure is "at rest", i.e. after transmission when the sensitive message has been saved to a persistent medium (hard disk, etc.) either by the message viewer or by a legitimate third-party to the communication (email server operator, etc). The time frame of unauthorized access during transmission is typically only seconds. The time frame of unauthorized access at rest is indefinite.

Although secure transmission mechanisms, such as SSL/HTTPS, may be used relatively successfully to prevent unauthorized access during transmission, most transmissions of information across the Internet do not use such mechanisms. Furthermore, the use of SSL does not guarantee end-to-end protection for the lifetime of the message and does not reduce the vulnerability of the information once it has been received and then stored.

Almost invariably, messages that are transmitted over the Internet are stored in multiple locations. For example, a single email message might be stored on the sender's local computer, at the sender's mail server (at least temporarily), at the recipient's mail server (at least temporarily), and on the recipient's local computer, among many other potential locations. Backups that are made of any of these locations result in additional copies of the same email message being created and stored, possibly for long periods of time. Any of these copies which are not encrypted are exposed to being accessed by unauthorized third parties. Due to the difficulties of indexing, searching, and retrieving encrypted data, most operators of servers choose not to encrypt the data at rest. Furthermore, even if encryption at rest is employed by server operators, users cannot independently verify this, and must simply trust the claims of the server operator. User that require a higher degree of certainty need to control the encryption process directly.

Most encryption solutions, however, require significant effort to set up and use, even for sophisticated users. For example, using a public-private key encryption system to encrypt email might require a user to install special encryption software on each computing device (e.g., home desktop computer, business desktop computer, laptop computer, smartphone) from which he intends to send email, create a public and private key, distribute the public key, and then use the installed encryption software to send email messages. This is a significant amount of effort. Furthermore, for such a system to work, it is typically necessary for recipients of encrypted email to also take similar steps on their own computers. Because configuring and using such encryption systems is so onerous, all but the most sophisticated and dedicated users do not use them, opting instead to communicate sensitive information without encryption, and thus insecurely.

Web applications are often employed in situations where, for various reasons, it is desirable to avoid the deployment of traditional desktop software. Typically web applications perform most of the important data processing on a central web server, while the user's computer merely presents an interface in a web browser. Some web-based encryption solutions have been created to shield end users from the complexity of encryption. To use such system, a user enters a sensitive message into a form on a web page and submits it to the server. The web server then encrypts the message and either returns it to the user or sends it directly to a user-specified recipient. Although such systems eliminate the need for the sender and viewer to install special software on their computers, such systems require the users to trust the operator of the web site's server, because the unencrypted data of the message is stored, however briefly, on the server, where it is potentially exposed to unauthorized access by third parties. Savvy users find this trust requirement unacceptable and, as a result, refuse to use such systems.

What is needed, therefore, is an encryption system which provides the ease of use of web-based applications without exposing unencrypted data to the system's operator.

SUMMARY

In one embodiment of the present invention, a first user—the creator—uses a web browser to encrypt some information. The web browser provides to the creator a URL which contains the key used for encryption, such as in the form of an anchor embedded within a URL. The web browser also provides a hash of the cryptographic key and the encrypted information to a web server. The creator transmits the URL to a second user—the viewer—who provides the URL to a web browser, thereby causing the web browser to navigate to a decryption web page maintained by the web server, but without transmitting the cryptographic key to the web server. The viewer's web browser hashes the cryptographic key and sends the hash to the web server, which uses the hash to identify and return the encrypted information to the viewer's web browser, which in turn uses the encryption key to decrypt the message and display the decrypted message to the viewer.

Other features and advantages of various aspects and embodiments of the present invention will become apparent from the following description and from the claims.

DETAILED DESCRIPTION

Figure 1:
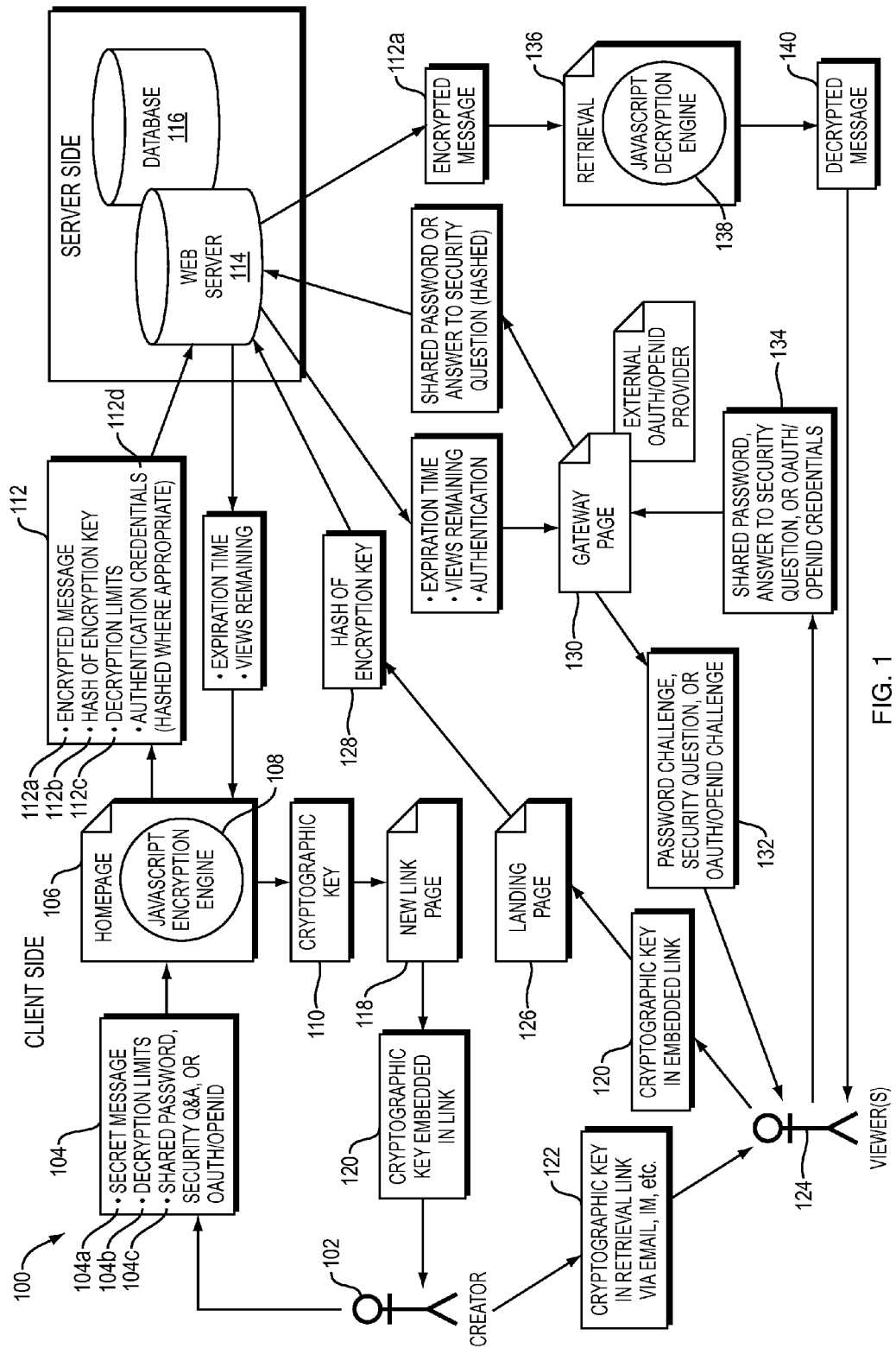
FIG. 1 is a dataflow diagram of a system for encrypting, transmitting, and decrypting a message according to one embodiment of the present invention.
Figure 2:
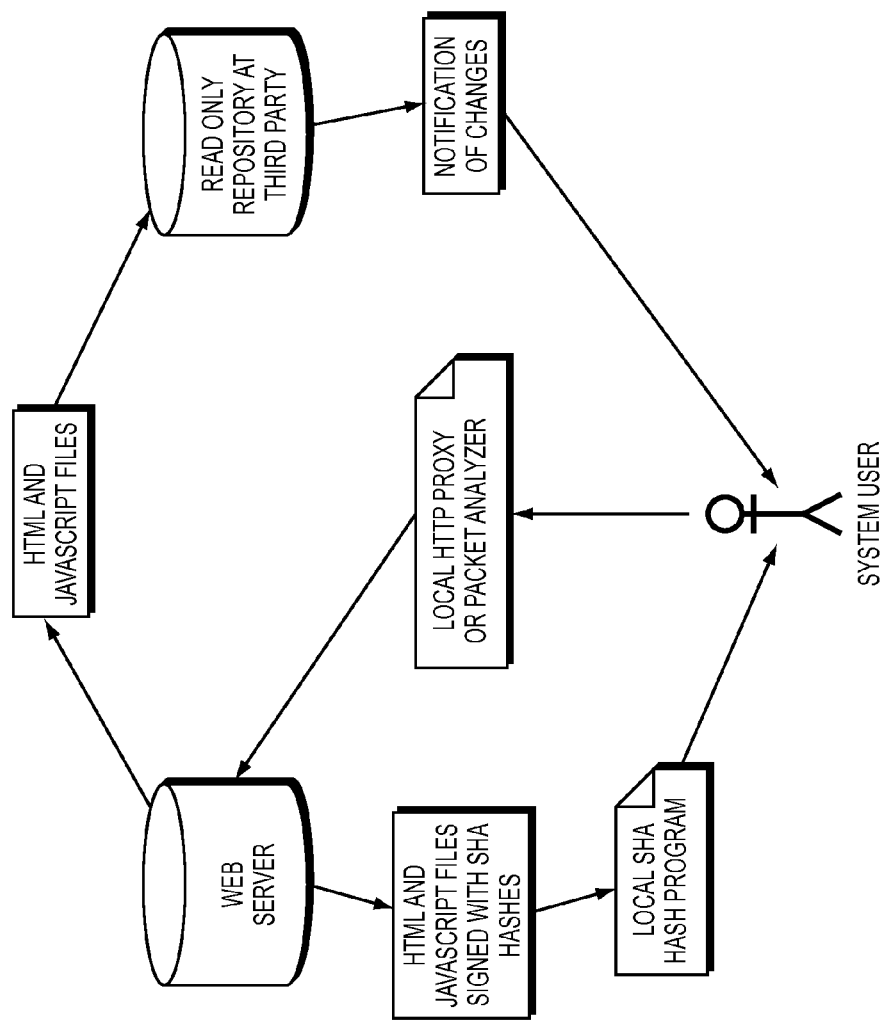
FIG. 2 is a dataflow diagram of various methods a user of the system might employ to verify the integrity and correct operation of the system of FIG. 1.

Embodiments of the present invention may be used to encrypt a private message, rendering it safe for transmission over a network (such as the Internet) in the clear, and then decrypt the message. For example, referring to FIG. 1, a dataflow diagram is shown of a system 100 for encrypting, transmitting, and decrypting a message according to one embodiment of the present invention.

A user 102 (also referred to herein as the "creator" or "sender") visits a web page 106, such as a secure (e.g., SSL) web page using a web browser executing on a computing device, such as a desktop computer or a smart phone. The user 102 provides a variety of input data 104 into the web page 106. For example, the web page 106 may display a form into which the user 102 may type text 104a (of any length) to be encrypted. Optionally, the user 102 may also input, through the web page 106, certain limits on decryption 104b and/or authentication data 104c used to authenticate viewers.

The user 102 may enter the input data 104 using a secure mechanism other than a web page. The user 102 may enter the plain text 104a in any manner, such as by typing the text 104a or pointing the web browser to a file containing the text or binary data.

The decryption limits 104b may include, for example, a maximum number of times that the encrypted information may be decrypted and/or a time period after which decryption is no longer allowed. For example, the user 102 might specify, in the decryption limits 104b, that the encrypted information may be decrypted up to three times within the next 24 hours, after which the encrypted information may no longer be decrypted. The system 100 may enforce the encryption limits 104b by, for example, deleting the encrypted information once the criteria specified by the encryption limits 104b have been reached, thereby making further decryption of the encrypted information impossible.

The authentication requirements 104c may be implemented using, for example, any one or more of the following: a shared secret password or passphrase, a security question and answer, a third-party hosted authentication system, cell phone verification, email verification, and physical authentication devices.

An authentication password or passphrase is a series of characters that the viewers would need to enter in order to authentication themselves. The password would need to be already known to the viewers or communicated to them by the sender separately from the cryptographic asset.

An authentication question and answer is similar to an authentication password but includes a question that is presented to the viewer as a prompt. This is meant to eliminate the need for a pre-known or separately communicated password. For example, a question might be "What's the name of the cafe we had coffee at on Monday?"

Third-party hosted authentication system are typically based on systems like OAuth or OpenID. Examples include Twitter's oAuth service, Gmail's OpenID service, and Facebook's Facebook Connect Service. These services allow other external services, such as this embodiment of the invention, to present users with the first service's authentication interface. The first service then informs the second service if authentication succeeded or failed. Using these types of services the embodiment can authenticate viewers against popular services without being privy to any sensitive data from those services. Therefore if a creator simply knows the userid of a viewer (e.g. their Gmail address, or Twitter ID), this embodiment can authenticate the viewer securely.

Cell phone authentication requires the creator to enter the viewer's cell phone number. Then a code may be sent to a viewer's cell phone number when they attempt to decrypt the message, in response to which the viewer may enter the code into a web page to verify their identity.

Email authentication is similar to cell phone authentication except the code would be sent via email not SMS.

Physical authentication devices include a variety of hardware based solutions such as biometric scanners and one-time password generators.

In short a wide variety of methods can be used to authenticate viewers and this invention is flexible enough to allow for the future integration of new methods.

The authentication requirements 104c are optional, because the sender 102 may not require authentication of the viewers(s) 124. For example, if the creator 102 is instant messaging with another user and needs to convey sensitive information to the other user, the sender 102 may use the system 100 to encrypt the sensitive information 104a and send the encrypted output 120 by instant message to the other user 124. In this case, the sender 102 might not require authentication of the viewer 124 because the sender 102 is currently engaged in an IM session with the viewer 124. In this case, the sender 100 may transmit the encrypted message 122 to the viewer who immediately decrypts the message. Then the cryptographic key (or the encrypted message, depending on which was sent to the viewer(s)) could be deleted by the sender, viewer, or the system itself within a matter of seconds.

Creator preferences, such as the decryption limits 104b and authentication requirements 104c, may be stored, for example, in Document Object Model (DOM) storage. This allows the system to provide the client-side functionality of cookies, namely that user-specific data survive across browser sessions, but without incurring the privacy risk associated with cookies, because DOM storage data, unlike cookie data, are not transmitted to the server with each request. Mechanisms other than DOM storage, however, may be used to implement user preferences.

Once the creator 102 provides the input data 104, the system 100 encrypts the plain text 104a. In the embodiment illustrated in FIG. 1, the encryption is performed solely using an encryption engine 108 executing in the web browser of the sender 102. In one embodiment, the encryption engine 108 is implemented using JavaScript within the web page 106. Mechanisms other than JavaScript, however, may be used to implement the encryption engine 108.

Although the decryption key 112b shown in FIG. 1 is a 256-bit key, a key of any size may be used. Furthermore, the encryption engine 108 may select the key 112b in any way, and may use any encryption technique to produce the encrypted message 110 from the plain text 104a.

The encryption engine 108 may generate the encryption key 112b in any of a variety of ways. For example, the encryption engine 108 may generate the encryption key 112b by collecting information about the keystrokes and mouse movements of the user 102, and using such information to generate entropy information which is used as a seed to a pseudo-random number generator for generating the encryption key 112b. If, by the time the user 102 submits the form on the web page 106, sufficient entropy information has not been collected, the encryption engine 108 may prompt and require the user 102 to provide more entropy information by moving the mouse or providing some other form of non-predictable input until sufficient information has been collected to generate a strong cryptographic key.

The encryption engine 108 produces output including both the encrypted information 110 and a cryptographic key 112b. These two outputs are known generically as "cryptographic assets." One of the cryptographic assets will be transmitted by the system 100 to a server for storage and later retrieval. The other cryptographic asset will be returned to the user 102 so that the user 102 may communicate it to intended viewers by whatever means the user 102 prefers. Which of the two cryptographic assets is stored and which is returned to the user is not important to the functioning of the system. The two are effectively interchangeable. For clarity, this discussion (but not FIG. 1) will use the generic term "cryptographic asset" when referring to either the encrypted information or the cryptographic key.

The encryption engine 108 may transmit a variety of data 112 to a web server 114, such as one of the cryptographic assets (encrypted message 110 or cryptographic key 112b), a hash of the other cryptographic asset, (optionally) the decryption limits 104b, and (optionally) the authentication information 104c. For ease of explanation, FIG. 1 assumes that the encryption engine 108 transmits the encrypted message 112a and encryption key hash 112b to the web server. The encryption engine 108 may transmit all of the information 112 to the web server 114 using a secure mechanism such as SSL. The web server 114 stores whatever information it receives in a database 116 or other data storage mechanism.

Whichever cryptographic asset is given to the user 102, is not transmitted to the server 114. However, a hash 112b of that cryptographic asset is transmitted to the server 114. Hashing is a secure, standard, one-way form of encryption which enables the system 100 to uniquely identify a specific datum without allowing access to the datum itself. Because hashing is a one-way process, the system cannot "unhash" the message and compromise the user's privacy.

As mentioned above, the encryption engine 108 may transmit either the cryptographic key 110 or the encrypted message 112a to the server 114. The encryption engine 108 may decide which of these two cryptographic assets to send to the server 114 in any of a variety of ways. For example, the encryption engine 108 may be pre-programmed or pre-configured (e.g., by a system administrator) to send a particular cryptographic asset to the server 114. Alternatively, for example, the user 102 may specify (e.g., using the input 104) which of the cryptographic assets to send to the server 114. As yet another example, the encryption engine 108 may determine which of the encrypted message 112a and encryption key 110 is shorter, and then transmit the shorter cryptographic asset to the user 102, and transmit the other (longer) cryptographic asset to the server 114.

In the example shown in FIG. 1, the encryption engine 108 transmits the cryptographic key 110 to the creator 102, although, as described above, the encrypted message 112a could instead be transmitted to the creator 102. In the example illustrated in FIG. 1, the cryptographic key 110 is transmitted to the creator 102 within a URL 120 within a web page 118. The cryptographic asset may (110 or 112a), for example, be embedded within the URL as an anchor, as in the following example: https://example.com/#PqiQgTb7cTyDQjmLnRpxYD6okIE2a3E8g015i0acWa.

In this example, the cryptographic asset 110 is the text which follows the pound sign. In this example, the cryptographic asset (cryptographic key 110 or encrypted information 112a) is encoded in Base64, although other encoding schemes may be used. The cryptographic asset may, for example, be encoded as Unicode, to reduce its length in comparison to ASCII encoding.

As an alternative to returning the cryptographic asset to the creator 102 within a URL, the encryption engine 108 may, for example, provide the cryptographic asset to the creator 102 by saving the cryptographic asset into a file on the computing device of the sender 102. This would be useful, for example, in situations where the cryptographic asset is so long as to be exceed the maximum supported URL length for some or all web browsers.

However the cryptographic asset is encoded and provided to the creator 102, once the creator 102 receives the cryptographic asset, the creator 102 may transmit the cryptographic asset to a viewer(s) 124 in a message 122 in any manner, such as by using email, instant messaging, SMS, or messaging on a social networking site (e.g., Facebook or Twitter). Such transmission may or may not be performed using a secure channel (e.g., SSL). For example, the creator 102 may transmit the link shown above to the viewer(s) 124, thereby transmitting the cryptographic asset contained within the anchor of the link.

Transmission of the link 120 by the sender 102 may be performed using any messaging mechanism 122, such as a standard email client connected to an outgoing email server. As another example, the system 100 may include its own messaging mechanism 122 for use by the sender 102 to send the link 120 to the viewer 124.

If a third party were to intercept the cryptographic asset en route to the viewer(s) 124, the intercepting party would only be able to compromise the message 104a by accessing the decryption mechanism (containing the missing cryptographic asset 112a) before the expiration (if any) specified by the decryption limits 104b, and successfully authenticating based on the authentication requirements 104c (if any). Therefore, transmission of the cryptographic asset on a non-secure channel exposes only as much information to third parties as any other recognized secure encryption system.

Similarly, if copies of the cryptographic asset are made at any point between the creator 102 and the viewer(s) 124, only one cryptographic asset will be copied. As a result, a third party who obtains access to any such backup copy will lack sufficient information to compromise the message 104a easily.

Once the viewer 124 receives a message containing either cryptographic asset 122, the encrypted information may be decrypted as follows. In general, the cryptographic asset (e.g., everything after the pound sign in the example URL 120 above) may be hashed and matched with the hash 112b that was previously stored in the server database 116. This second hashing may be performed, for example, by a web browser running on a local client computer of the viewer 124. For example, if the cryptographic asset 110 is included within a link 120, the viewer 124 may copy the link into a web browser, thereby causing the server 114 to send to the viewer's web browser a landing page 126 which contains code (e.g., JavaScript code) necessary to create a hash 128 of the cryptographic asset 110. If the viewer 124 received the cryptographic asset 110 intact, then the hash 128 created by the viewer's browser should match the hash 112b originally created by the creator's browser.

The viewer's web browser transmits the hash 128 to the web server 114. The web server 114 then uses the hash as an index to the database 116 and locates the record stored during encryption. If no matching hash is located the system can notify the user of such.

Note that the web browser does not send the cryptographic asset itself (e.g., the cryptographic key 110) to the web server 114. For example, if the cryptographic asset 110 is embedded as an anchor within a link 120, as in the example provided above, the viewer's web browser does not transmit the anchor to the web server 114 when sending the web page request to the web server 114. This is the behavior specified by the HTTP standard for handling URL anchors. As a result, the web browser receives the cryptographic asset (e.g., the cryptographic key 110) from the viewer 124 and is capable of locally executing javascript and other code which uses the cryptographic asset 110 as an input, but without transmitting the cryptographic asset 110 to the server 114. As a result, the web server 114 never has access to both cryptographic assets. As a result, the message 104a cannot be compromised by someone solely by gaining access to the server 114.

Because the server 114 has access to the decryption limits 104b, however, the server 114 may delete the cryptographic asset (encrypted information 112a or cryptographic key 110) from the database 116 once the criteria specified by the decryption limits 104b have been satisfied (e.g., maximum number of decryptions or time limit). The server 114 may inform the viewer(s) 124 that such deletion has been performed.

Furthermore, any information stored on the server database 116 (such as the encrypted message 112a or hash thereof, encryption key 110 or hash thereof 112b, decryption limits 104b, or authentication credentials 104c) may be deleted at any time by the creator of such information 102. Optionally, the viewer(s) 124 may be given (e.g., by the creator 102) the ability to delete the encrypted information 112b and/or cryptographic key 110 from the server 116. This may be useful, for example, to enable the viewer(s) 124 to delete such information immediately after the viewer 124 has retrieved it even if the explicit decryption limits 104b have not yet been met.

If a matching record is found and none of the decryption limits 104b have been reached, then if any authentication requirements 104c are associated with the encrypted information, the web server 114 may transmit the authentication requirements 104c to the viewer's web browser in a gateway page 130, through which the viewer's web browser presents the viewer 124 with a password challenge, security question, or other prompt for authentication information 132. The viewer 124 provides a response 134 to the prompt, through the viewer's web browser, which transmits the response 134 back to the web server 114. If the web server 114 determines that the viewer 124 successfully satisfied the authentication requirements 104c, then the web server 114 transmits the stored cryptographic asset back 112a to the viewer's web browser securely via SSL within a retrieval web page 136. The retrieval web page 136 contains a decryption engine 138, which may be implemented using JavaScript or other client-side code, which uses the encryption key 110 to decrypt the encrypted message 112a, thereby producing a decrypted message 140 which has the same content as the original message 104a. The viewer's web browser displays the decrypted message 140 to the viewer.

As mentioned above, the creator 102 could enter the message 104a to be encrypted by, for example, typing the message and/or pointing the creator's web browser to a file(s) containing the message to be encrypted. If the sender 102 provides both text and a pointer to one or more files, the text may be encrypted using the techniques disclosed above, and the files may be encrypted using the same cryptographic key that is used to encrypt the text. If the sender 102 provides no text but only a pointer to one or more files, the system 100 may encrypt a random piece of text for hashing/identification purposes, and encrypt the file(s) using the same cryptographic key that is used to encrypt the text. In either case, the results of encrypting the file(s) may be stored in one or more files.

The system 100 may store the encrypted file(s) in the server database 116 and return the cryptographic key 110 to the sender 102, or store the cryptographic key in the server database 116 and prompt the sender 102 to store the encrypted file(s) locally. In either case, the system 100 still provides the sender 102 with output, such as a URL with the encrypted version of the (user-provided or randomly-generated) text message. The user 102 may then transmit the URL 120 in the manner described above, in conjunction with the encrypted file(s), to the viewer 124. To decrypt the file(s), the viewer's web browser would need to retrieve the other cryptographic asset in the manner described above. The user's web browser would then prompt the user either to download the file(s) stored on the server 114 or to load any files that were had been sent by the creator. The viewer's web browser would then decrypt the files and prompt the viewer 124 to save the decrypted files locally.

The system may allow creators to monitor events that happen to their cryptographic assets on the server. Such events include requests for the asset's landing page, successful and failed authentication attempts, expiration due to exceeded limits (time and number of decryptions), and expiration due to an explicit request from either creator or viewer. Each event may contain multiple pieces of information, including but not limited to, the time of the event, and the IP address of the computer triggering the event. The system may allow the creator while monitoring these events to respond in real-time. For example, by helping someone with authentication, or, if access attempts seem suspicious, by deleting the server-stored cryptographic asset. The system may allow a creator to save the record of events thereby creating an audit trail of the privileged communication.

The most error-prone step in the encryption process is adding authentication. Two different features mitigate this difficulty, namely the Contact Manager and Personalized Viewer Pages.

The Contact Manager feature would allow users to store information about their frequent viewers (including their preferred authentication method) in the system.

The Personalized Viewer Page feature allows a user who expects to be a frequent viewer to define their own ongoing authentication method. Creators who wish to encrypt a message for someone with a Personalized Viewer Page would visit the associated "vanity URL" (e.g. johndoe.system.com) which the viewer has made public. This page would not require the creator to enter any authentication information because that information has already been provided by the viewer. After encryption is complete the system may also inform the creator of the viewer's preferred method of contact (e.g. email, direct Twitter message, etc).

Heretofore, this discussion has assumed all creators to be human beings. However, the system may also allow other software agents to store encrypted messages via an Application Programming Interface (API). This would be useful, for example, to a web application sending out a forgotten password to one of its users. Under the API scenario, the software agent would use a local encryption engine that is functionally-equivalent to the Javascript engine discussed above but could be implemented in any programming language.

One way in which someone might try to attack the system 100 would be to guess at valid URLs or authentication information. Such an attack would require a large number of requests to be made to the server 114 in a short period of time, most likely distributed across many client machines. To protect against these types of attacks, the system 100 may detect requests which are performed with excessive frequency, and then slow the system 100 down by, for example, requiring potential viewers to complete a CAPTCHA challenge, or by requiring a minimum amount of time (e.g., 5 seconds) to elapse between the serving of the landing page 126 or gateway page 126 and the subsequent submission of a form from that page. Such a slowdown would make an automated guessing attack too slow to be effective.

Embodiments of the present invention have a variety of advantages. For example, embodiments of the present invention provide ease of use without exposing unencrypted data to the system's operator. For example, referring to FIG. 1, the creator 102 may encrypt and transmit the message 104*a* using only a standard web browser and without manually creating an encryption key. The creator 102 need not install or configure any additional encryption software on the creator's computer. Instead, the experience from the creator's point of view is essentially one of entering the message 104*a* into the web page 106 and then transmitting the encrypted message 120 to the viewer 124.

Similarly, the viewer 124 may receive and decrypt the encrypted message 122 using only a standard web browser, without the need to install any additional encryption software on the viewer's computer. Instead, the experience from the viewer's point of view is essentially one of pasting the encrypted message 122, embedded in a link, into a web browser and then, if necessary, authenticating himself. Furthermore, the ability of the viewer 124 to decrypt the message 122 using only a standard web browser means that the creator 102 can be confidently transmit the encrypted message 122 to any viewer and know that such a viewer will be able to decrypt the message without experiencing compatibility problems. In fact, embodiments of the present invention may be used in connection with all popular operating systems and web browsers.

A related advantage of embodiments of the present invention is that they use a symmetric system, which is superior to asymmetric solutions in so for as a symmetric system does not require the creator 102 or viewer 124 to maintain ongoing encryption keys.

Such ease of use, however, does not sacrifice security, because the web server 114 which coordinates the encryption and decryption process never has access to both of the cryptographic assets (i.e., encrypted information and encryption key) which are necessary to decrypt the encrypted information.

In contrast to conventional server-side encryption, embodiments of the present invention do not require the creator 102 or viewer 124 to trust the server 114 with the sensitive contents of the message 104*a*. Instead, the server 114 never possesses the plain text message 104*a* nor all of the cryptographic assets required to decrypt the cipher text 110. Therefore, neither the administrator of the server 114, nor any malicious party with illicit access to the server 114 can read the private message 104*a*.

Another advantage of embodiments of the present invention over conventional server-side encryption is that users may verify for themselves that embodiments of the present invention work as advertised. For example, users may inspect the JavaScript encryption engine 108 and decryption engine 138 to examine their operation. As another example, users may verify the checksums of the JavaScript and HTML code used by embodiments of the present invention using, for example, OpenSSL, to verify that such code has not been altered in transit. The canonical checksums may be published in a public code repository, such as Github.

As yet another example, users may verify that the encryption techniques used by embodiments of the present invention are interoperable with OpenSSL, a popular open source encryption package. Successful verification confirms that the system 100 is not encoding any additional information (such as user tracking data) in the cryptographic assets.

Users may also verify the proper operation of embodiments of the present invention using packet analyzer tools, such as Wireshark or Fiddler, which allow users to analyze the information transmitted and received by their web browsers. Users may use such packet analyzers to verify that embodiments of the present invention are transmitting the encrypted information or cryptographic key, but not both, and not the plain text of the message.

As yet another example of user verification, users may use privacy monitoring software, such as those built in to standard web browsers or add-ons such as Ghostery, to examine the JavaScript and HTML used by embodiments of the present invention, to ensure that no privacy-compromising techniques, such as cookies or third-party analytic tools, are used. Conventional server-side encryption techniques do not enable users to verify the proper operation of the system in this or any of the other ways described above.

Embodiments of the present invention offer encryption of the message 104*a* both in transmit and at rest (e.g., when the encrypted message 112*a* is stored). In contrast, conventional use of SSL communication to transmit messages only protects such messages in transit, not at rest, thereby exposing such messages to compromise after they have been transmitted Many encryption solutions require the creator 102 to create a password from which the cryptographic key is generated. Human-created passwords are notorious for being easy for third parties to guess. Embodiments of the present invention, in contrast, may use much stronger machine-created passwords and cryptographic keys. Furthermore, in embodiments of the present invention, neither the creator 102 nor viewer(s) 124 need know the machine-created password. As a result, neither the creator 102 nor viewer(s) 124 could reveal the password even if they were coerced.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although certain examples disclosed herein described transmission of certain information as being performed over a secure channel, such as by using SSL, this is merely an example and does not constitute a limitation of the present invention. Instead, transmission of any of the data disclosed herein may be performed using insecure channels.

Although certain examples disclosed herein describe the use of a web browser, more generally any reference herein to web browsers applies equally to clients other than web browsers. Similarly, although certain examples disclosed herein describe the use of web servers, more generally any reference herein to web servers applies equally to servers other than web servers. For example, the techniques disclosed herein may apply to a client-server system in which the client is not a web browser and in which the server is not a web server.

The techniques described above may be implemented, for example, in hardware, software tangibly embodied in a computer-readable medium, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method comprising:
   receiving, by a first computing device, an unencrypted asset;
   encrypting the unencrypted asset with an encryption key by the first computing device to create an encrypted asset;
   transmitting the encrypted asset and a first hash of the encryption key from the first computing device to an untrusted server via the Internet, wherein the first hash of the encryption key identifies the encrypted asset at the untrusted server;
   generating a uniform resource identifier by the first computing device, the uniform resource identifier including the encryption key and identifying the untrusted server as storing the encrypted asset;
   transmitting the uniform resource identifier including the encryption key to a second computing device, thereby allowing the second computing device to access the encrypted asset by providing the untrusted server identified in the uniform resource identifier with a second hash of the encryption key to access the encrypted asset without providing the untrusted server with an unhashed version of the encryption key or the unencrypted asset,
   wherein the encryption key is included in the uniform resource identifier as an anchor, thereby causing the second computing device to exclude the anchor from a request to access the encrypted asset made to the untrusted server by the second computing device.

2. The method of claim 1, wherein transmitting the encrypted message and the first hash of the encryption key to an untrusted web server is performed using an unsecured connection between the first computing device and the untrusted web server.

3. The method of claim 1, wherein the resource identifier comprises a URL.

4. The method of claim 3, wherein the URL points to the untrusted web server.

5. The method of claim 1, wherein the unencrypted asset is selected from a group of assets consisting of:
   a text message; and
   an unencrypted file.

6. The method of claim 1, wherein the encryption key comprises a symmetric key.

7. A method comprising:
   receiving, by a computing device, a uniform resource identifier identifying an untrusted server as storing an encrypted asset, the uniform resource identifier including a decryption key; and,
   in response to selection of the uniform resource identifier by the computing device:
      transmitting a request to the untrusted server identified by the uniform resource identifier without providing the untrusted server the decryption key;
      transmitting a hash of the decryption key to the untrusted server, the hash of the decryption key identifying the encrypted asset at the untrusted server;
      receiving the encrypted asset at the computing device in response to transmitting the hash of the decryption key to the untrusted server; and
      decrypting the encrypted asset at the computing device using the decryption key,
   wherein the decryption key is included in the uniform resource identifier as an anchor, thereby causing the computing device to exclude the anchor from a request to access the encrypted asset made to the untrusted server by the computing device.

8. The method of claim 7, wherein the encrypted asset is requested, received and decrypted automatically in response to selection of the uniform resource identifier by a user.

* * * * *